United States Patent
Casagrande

(10) Patent No.: US 9,615,122 B2
(45) Date of Patent: Apr. 4, 2017

(54) METHODS AND APPARATUS TO SYNCHRONIZE SECOND SCREEN CONTENT WITH AUDIO/VIDEO PROGRAMMING USING CLOSED CAPTIONING DATA

(71) Applicant: ECHOSTAR TECHNOLOGIES L.L.C., Englewood, CO (US)

(72) Inventor: Steven Michael Casagrande, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 31 days.

(21) Appl. No.: 14/168,178

(22) Filed: Jan. 30, 2014

(65) Prior Publication Data

US 2015/0215665 A1     Jul. 30, 2015

(51) Int. Cl.
| | | |
|---|---|---|
| *H04N 21/43* | (2011.01) | |
| *H04N 21/262* | (2011.01) | |
| *H04N 21/488* | (2011.01) | |
| *H04N 21/237* | (2011.01) | |
| *H04N 21/858* | (2011.01) | |

(Continued)

(52) U.S. Cl.
CPC ....... *H04N 21/4307* (2013.01); *H04N 21/233* (2013.01); *H04N 21/237* (2013.01); *H04N 21/26258* (2013.01); *H04N 21/4126* (2013.01); *H04N 21/43637* (2013.01); *H04N 21/4782* (2013.01); *H04N 21/4884* (2013.01);
(Continued)

(58) Field of Classification Search
CPC ........... H04N 21/4884; H04N 21/4622; H04N 21/4722; H04N 21/84; H04N 5/445; H04N 21/4542; H04N 7/0885; H04N 21/4828; H04N 21/4307; H04N 5/278; H04N 5/765; H04N 21/41407
See application file for complete search history.

(56) References Cited

U.S. PATENT DOCUMENTS

| | | |
|---|---|---|
| 5,477,263 A | 12/1995 | O'Callaghan et al. |
| 2004/0040042 A1 | 2/2004 | Feinleib |

(Continued)

FOREIGN PATENT DOCUMENTS

| | | |
|---|---|---|
| GB | 2387687 A | 10/2003 |
| GB | 2489748 A | 10/2012 |

(Continued)

OTHER PUBLICATIONS

European Patent Office International Searching Authority, International Search Report and Written Opinion for International Application No. PCT/US2015/013876 mailed Apr. 1, 2015.

(Continued)

*Primary Examiner* — Pankaj Kumar
*Assistant Examiner* — Alazar Tilahun
(74) *Attorney, Agent, or Firm* — LK Global

(57) ABSTRACT

A method for synchronized utilization of an electronic device is provided. The method receives closed captioning data from an audio/video content receiver for a set of audio/video content; retrieves detail for a first event occurring in the set of audio/video content, wherein the first event is indicated by the received closed captioning data; and presents content to a user, using the electronic device, based on the retrieved detail.

13 Claims, 6 Drawing Sheets

(51) Int. Cl.
 *H04N 21/4782* (2011.01)
 *H04N 21/4363* (2011.01)
 *H04N 21/233* (2011.01)
 *H04N 21/81* (2011.01)
 *H04N 21/41* (2011.01)

(52) U.S. Cl.
 CPC ..... *H04N 21/4888* (2013.01); *H04N 21/8133* (2013.01); *H04N 21/8586* (2013.01)

(56) References Cited

U.S. PATENT DOCUMENTS

| | | | |
|---|---|---|---|
| 2005/0226601 A1 | 10/2005 | Cohen et al. | |
| 2007/0106760 A1* | 5/2007 | Houh | G06F 17/30247 709/219 |
| 2008/0204595 A1 | 8/2008 | Rathod et al. | |
| 2008/0219641 A1 | 9/2008 | Sandrew et al. | |
| 2010/0303159 A1 | 12/2010 | Schultz et al. | |
| 2011/0093882 A1* | 4/2011 | Candelore | H04N 7/163 725/28 |
| 2013/0279888 A1 | 10/2013 | Zeng et al. | |
| 2013/0300929 A1* | 11/2013 | Hines | H04N 21/6543 348/468 |
| 2014/0153903 A1 | 6/2014 | Gratton | |
| 2014/0223463 A1 | 8/2014 | Hatambeiki et al. | |

FOREIGN PATENT DOCUMENTS

| | | |
|---|---|---|
| WO | 0208869 A2 | 1/2002 |
| WO | 2012028851 A1 | 3/2012 |
| WO | 2013100978 A1 | 7/2013 |

OTHER PUBLICATIONS

European Patent Office International Searching Authority, International Search Report and Written Opinion for International Application No. PCT/US2015/013872 mailed Apr. 29, 2015.
USPTO Final Office Action, U.S. Appl. No. 14/168,181, dated Feb. 26, 2016.
USPTO, Office Action in U.S. Appl. No. 14/168,181 mailed Aug. 13, 2015.
U.S. Appl. No. 14/168,181, filed Jan. 30, 2014.

* cited by examiner

PLAYLIST 300

| | AUDIO/VIDEO CONTENT IDENTIFIER | | |
|---|---|---|---|
| | CLOSED CAPTIONING REFERENCE STRING | TIME OFFSET | SECOND SCREEN CONTENT DETAIL |
| EVENT 1 | CLOSED CAPTIONING REFERENCE STRING | TIME OFFSET | SECOND SCREEN CONTENT DETAIL |
| EVENT 2 | CLOSED CAPTIONING REFERENCE STRING | TIME OFFSET | SECOND SCREEN CONTENT DETAIL |
| EVENT 3 | CLOSED CAPTIONING REFERENCE STRING | TIME OFFSET | SECOND SCREEN CONTENT DETAIL |
| •••• | | | |
| EVENT N | CLOSED CAPTIONING REFERENCE STRING | TIME OFFSET | SECOND SCREEN CONTENT DETAIL |

FIG. 3

METHODS AND APPARATUS TO SYNCHRONIZE SECOND SCREEN CONTENT WITH AUDIO/VIDEO PROGRAMMING USING CLOSED CAPTIONING DATA

TECHNICAL FIELD

Embodiments of the subject matter described herein relate generally to the utilization of closed captioning data for audio/video programming. More particularly, embodiments of the subject matter relate to utilizing closed captioning data to synchronize second screen content with audio/video programming.

BACKGROUND

Increasingly, television viewers are using personal computing devices (e.g., smartphones, tablet computers, laptop computers, smart-watches, etc.) while watching television. Audio/video programming providers (e.g., broadcasters, television providers, on-demand programming providers, internet programming providers, and the like) may utilize this opportunity to connect with a viewer via their personal computing devices. The personal computing device used in conjunction with television viewing is known as a "second screen" or "companion screen".

Second screen content provides additional information to a user regarding specific audio/video content, to be presented to the user while viewing the specific audio/video content. More specifically, second screen content associated with a particular episode of a television program is intended to be viewed by a user simultaneously with the particular episode of the television program. Second screen content may include, additional information, interactive content, and content related to a specific set of audio/video programming. More specific examples may include, without limitation: webpages, pop-up text, targeted advertising, interactive content, or the like. Additionally, second screen software applications ("apps") were developed as a way to allow people to become more engaged with a particular television program during viewing.

Accordingly, it is desirable to provide users with intelligently selected content associated with second screen apps, such as presenting content directly associated to particular events currently occurring in programming while it is being viewed. Furthermore, other desirable features and characteristics will become apparent from the subsequent detailed description and the appended claims, taken in conjunction with the accompanying drawings and the foregoing technical field and background.

BRIEF SUMMARY

A method for synchronized utilization of an electronic device is provided. The method receives closed captioning data from an audio/video content receiver for a set of audio/video content; retrieves detail for a first event occurring in the set of audio/video content, wherein the first event is indicated by the received closed captioning data; and presents content to a user, using the electronic device, based on the retrieved detail.

A system for processing audio/video content is provided. The system includes an audio/video content receiver, configured to provide audio/video programming to a display device and to provide closed captioning data; a second screen electronic device, configured for use in conjunction with viewing the audio/video programming on the display device, wherein the second screen electronic device is configured to: receive the closed captioning data provided by the audio/video content receiver; access a remote server to retrieve detail for an event occurring in the audio/video programming, wherein the event is indicated by the closed captioning data; and present content to a user, based on the retrieved detail.

A non-transitory, computer-readable medium comprising instructions which, when executed by a computer, perform a method, is provided. The method receives, at a second screen electronic device, closed captioning data and metadata for a set of recorded audio/video programming during playback; identifies a programming event from the received closed captioning data; obtains associated information for the programming event; and presents supplemental content to a user on the second screen electronic device, based on the obtained associated information, wherein the content is presented when the event occurs in the set of audio/video programming.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 is a schematic representation of a playlist, in accordance with an embodiment;

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods and apparatus used by a second screen electronic device to synchronize the supplemental content it provides to a set of recorded audio/video programming during playback. This synchronization is accomplished using closed captioning data received from an audio/video content receiver. In certain embodiments, a playlist is retrieved from a remote server, which references events, closed captioning reference strings, and appropriate content for display on the second screen electronic device when each event occurs in the audio/video content during playback. In some embodiments, the system performs an internet search of specific terms occurring in the closed captioning data, and provides the resultant content to a user via the second screen software electronic device.

Figure 1:
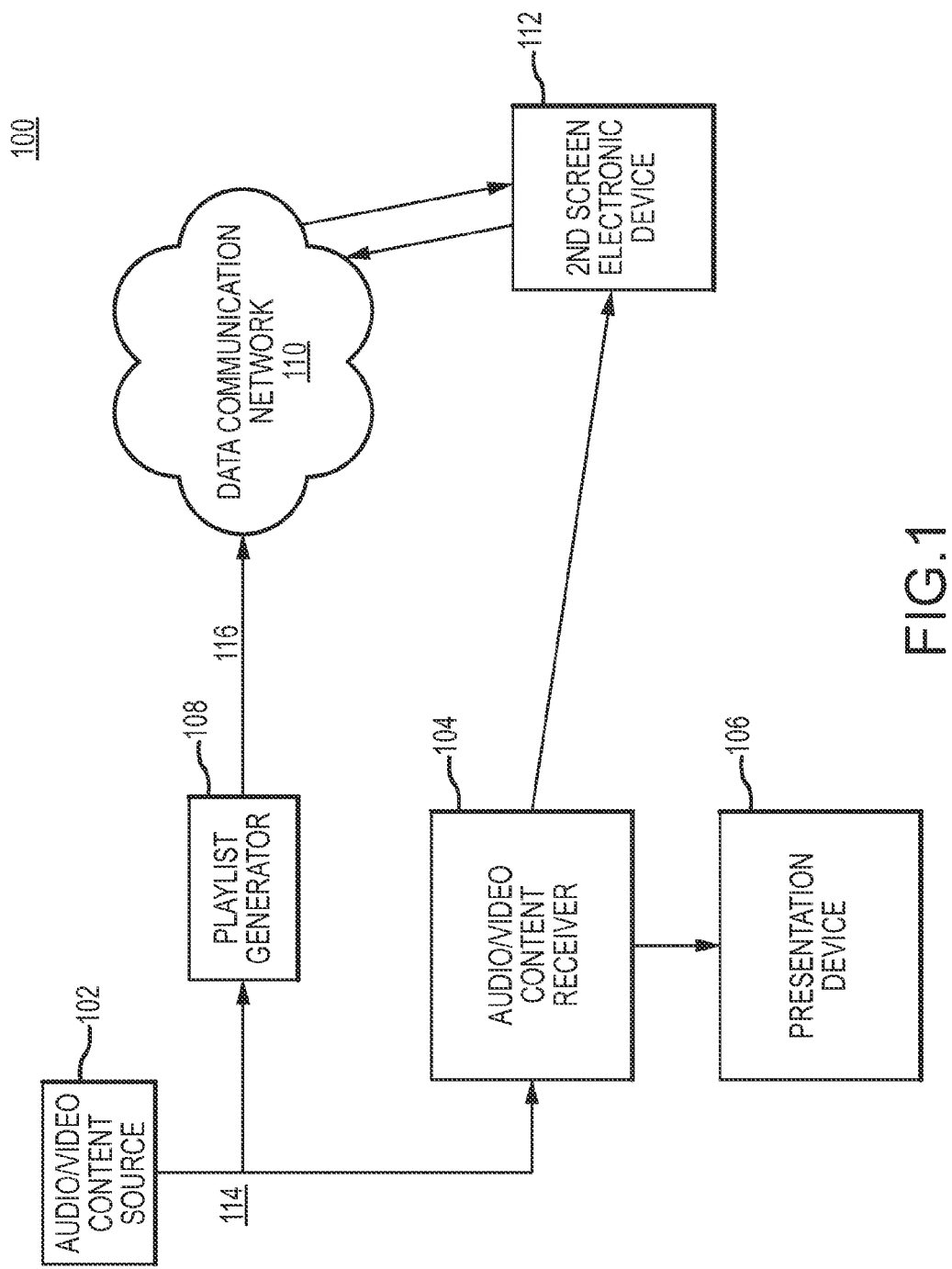
FIG. 1 is a schematic representation of a system for synchronizing second screen content with audio/video programming using closed captioning data, in accordance with an embodiment.

Referring now to the drawings, FIG. 1 is a schematic representation of a synchronization system 100 that is suitably configured to support the techniques for synchronizing second screen content with audio/video programming using closed captioning data, described in more detail herein. The synchronization system 100 may include, without limitation: a audio/video content source 102; a audio/video content receiver 104; a presentation device 106; a playlist generator 108; a data communication network 110; and a second screen electronic device 112. It should be appreciated that FIG. 1 depicts a simplified embodiment of the synchronization system 100, and that a realistic and practical implementation of the synchronization system 100 may include additional elements or components.

The audio/video content source 102 is suitably configured to provide a stream of audio/video content 114 (e.g., broadcast television programming, on-demand programming, internet programming, or the like) to an audio/video content receiver 104 and to a playlist generator 108. The audio/video content source 102 may utilize any data communication methodology, including, without limitation: satellite-based data delivery, cable-based data delivery, cellular-based data delivery, web-based delivery, or a combination thereof. In this regard, the synchronization system 100 may include or utilize an audio/video content delivery system (not shown). The specific details of such delivery systems and related data communication protocols will not be described here.

During typical operation, the audio/video content receiver 104 receives audio/video content 114 (such as primary program content interspersed with events of interest which may be associated with second screen content) signaling information, and/or other data via fiber, internet, wireless, or cellular networks, and/or off-air, satellite, or cable broadcasts. In certain embodiments, the audio/video content receiver 104 includes digital video disc (DVD) player technology, Blu-Ray player technology, or other video player technology, and receives audio/video content via input media. Such input media may also include universal serial bus (USB) storage, external hard disk storage, or the like. The audio/video content receiver 104 then demodulates, descrambles, decompresses, and/or otherwise processes the received digital data, and then converts the received data to suitably formatted video signals that can be rendered for viewing, and/or stored for future viewing, by the customer on the presentation device 106. The audio/video content receiver 104 is further configured to record received video audio/video content, and may comprise Digital Video Recorder (DVR) technology. Thus, the audio/video content receiver 104 can record audio/video content 114 and, during playback of the recorded content, be synchronized and utilized cooperatively with the second screen electronic device 112 to provide additional, supplemental content associated with the recorded programming.

The audio/video content receiver 104 produces output that is communicated to a presentation device 106. Each audio/video content receiver 104 may include or cooperate with a suitably configured presentation device 106. The presentation device 106 may be implemented as, without limitation: a television set; a monitor; a computer display; a portable electronic device; or any suitable customer appliance with compatible display capabilities. In various embodiments, each audio/video content receiver 104 is a conventional set-top box (STB) commonly used with satellite or cable television distribution systems. In other embodiments, however, the functionality of an audio/video content receiver 104 may be commonly housed within a presentation device. In still other embodiments, an audio/video content receiver 104 is a portable device that may be transportable with or without the presentation device 106. An audio/video content receiver 104 may also be suitably configured to support broadcast television reception, video game playing, personal video recording, video player technology (e.g., DVD, Blu-Ray, etc.), and/or other features as desired. In certain other embodiments, the audio/video content receiver 104, the presentation device 106, and the second screen electronic device 112 may be implemented as a single computing device, in which the audio/video programming presented by the audio/video content receiver 104 and presentation device 106 and the second screen content presented by the second screen electronic device 112 are presented using a shared screen of the single computing device.

The audio/video content receiver 104 is further configured to communicate output data to a second screen electronic device 112, including closed captioning data and timing data for audio/video content, via a wireless local area network (WLAN) or any suitable wireless technology. In some embodiments, the audio/video content 114 includes a sequence of video frames with associated timing information, formatted in accordance with the Motion Picture Experts Group (MPEG) standard. The closed captioning data identifies the set of audio/video content and presents subtitles, or captions, to viewers of the set of audio/video content. Closed captioning data is typically used as a transcription of the audio portion of a set of audio/video content, as it occurs (either verbatim or in edited form), sometimes including descriptions of non-speech elements. Timing information for each video frame may comprise a Presentation Time Stamp (PTS) value. A PTS is a reference timing value that is generally included in packet media streams (digital audio, video or data), according to the MPEG standard. PTS values are used to control the presentation time alignment of such media, through synchronization of separate components within a video content stream (e.g., video, audio, subtitles, etc.). In other embodiments, timing information for each video frame may comprise a Program Clock Reference (PCR) value. As used in association with compressed digital video, a PCR value consists of a time stamp that indicates an associated System Time Clock (STC) value at the time a packet leaves an encoder. Alternatively, an accurate Time of Day clock may be used.

The second screen electronic device 112 is suitably configured to receive data from the audio/video content receiver 104 and one or more remote servers, and to display supplemental content (i.e., "second screen content" or "companion screen content") indicated by the received data. In certain embodiments, the second screen electronic device 112 displays this coordinated, supplemental content to a user while the user is viewing recorded audio/video content played back by the audio/video content receiver 104. In some embodiments, the second screen electronic device 112 displays this coordinated, supplemental content to a user while the user is viewing live content, or content during a first broadcast or other form of audio/video content distribution, via the audio/video content receiver 104. The second screen electronic device 112 may be implemented as a handheld electronic device, such as a tablet computer or smartphone; a laptop computer; a netbook; a smart-watch; or any other type of computing device. In certain embodiments, the second screen electronic device 112 may be implemented as the same apparatus as the audio/video content receiver 104 and the presentation device 106. In some embodiments, the second screen electronic device 112 may use a specialized software application ("app") to perform the functionality associated with cooperatively providing second screen content for a user to view while watching the audio/video content provided by the audio/video content receiver 104.

In certain embodiments, the second screen electronic device 112 communicates with one or more remote servers to retrieve the second screen content via the data communication network 110. However, in some embodiments, the second screen electronic device 112 receives second screen content from the audio/video content receiver 104 itself. In this example, the second screen content may be received by the audio/video content receiver 104 simultaneously with the audio/video content 114, when the audio/video content 114 is transmitted or "streamed" by an audio/video content source 102. In other embodiments, the second screen content may be received by the audio/video content receiver 104 before or after receipt of the audio/video content 114. Alternatively, in embodiments where the audio/video content is received at the audio/video content receiver 104 via stored digital media (e.g., DVD, Blu-Ray, USB, external hard disk, etc.) the second screen content may be stored on the digital media, for retrieval by the audio/video content receiver 104 during playback. Second screen content provides additional information to a user regarding specific audio/video content, to be presented to the user while viewing the specific audio/video content. More specifically, second screen content associated with a particular episode of a television program is intended to be viewed by a user simultaneously with the particular episode of the television program. Second screen content may include, without limitation: webpages, pop-up text, targeted advertising, interactive content, or the like.

In practice, the data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to video/media communication systems, video/media broadcasting systems, data transmission, signaling, network control, and other functional aspects of the systems (and the individual operating components of the systems) may not be described in detail herein.

The audio/video content source 102 provides media content (such as audio/video programming, advertising content, music programming, and other video or audiovisual content) to the audio/video content receiver 104 and the playlist generator 108. The playlist generator, in turn, provides output in the form of a playlist 116, to a remote server via a data communication network 110. The playlist generator 108 operates in parallel with the normal video delivery system.

The playlist generator 108 is configured to create a playlist of "events of interest" occurring in a set of audio/video content that are synchronized with appropriate second screen content displayed on the second screen electronic device 112. Generally, the events may include anything occurring in the audio/video content which may initiate simultaneous viewing of associated second screen content. The playlist generator 108 is further configured to associate the located events with corresponding closed captioning data occurring simultaneously in the audio/video content 114, and to create a playlist 116 to include located events, the associated closed captioning data, and references to second screen content associated with each event.

Synchronization occurs when the appropriate, coordinating second screen content appears at the same time that an associated event occurs during playback of the audio/video content. Such supplemental content enhances the viewing experience by providing supplemental information and/or interactive content. For example, a character in a television show places a laptop computer on a table and utters the word "Hello!" at the same time, during playback of the recorded television show. Here, the action of setting the laptop computer on the table is the event of interest, and the word "Hello!" would be the associated closed captioning data. The second screen electronic device receives closed captioning data (e.g., "Hello!") indicating the laptop was placed on the table, and presents appropriate second screen content to the user simultaneously. Appropriate second screen content, in this example, may include an advertisement for the particular brand of laptop, a webpage for purchasing the particular brand of laptop, etc.

The playlist generator 108 may be implemented as one or more computer-based devices, components, or systems. The playlist generator 108 receives audio/video content 114 from the audio/video content source 102 for processing, and processes the audio/video content 114 to identify and/or extract information regarding the stream of audio/video content 114. For example, the playlist generator 108 analyzes the stream of audio/video content 114 to locate a plurality of events occurring within the audio/video content 114. The playlist generator 108 associates each located event with closed captioning data appearing simultaneously with each event.

The playlist generator 108 may be manually operated, using human input, or may be operated using specialized computer hardware, software, or other technology to determine, designate, and/or record the occurrence of specific events and to associate the specific events with closed captioning data appearing nearest in time to each event (also called a closed captioning reference string). The playlist generator 108 is further configured to associate each of the events with references to appropriate supplemental content for presentation on a second screen. The playlist generator 108 catalogs the events, associated closed captioning reference strings, and associated supplemental content as a playlist.

The playlist generator 108 produces output, comprising the playlist 116 for the audio/video content 114, and communicates this playlist 116 to one or more remote servers, via the data communication network 110, for localized use by second screen electronic devices 112. In certain embodiments, the playlist 116 is provided outside of the synchronization system 100, and is already located on a remote server for retrieval by a second screen electronic device 112 via the data communication network 110. In this case, the playlist generator 108 is not necessary and is therefore not included in the synchronization system 100.

In a first implementation of the synchronization system 100, the second screen electronic device 112 retrieves a playlist 116 from a remote server, via the data communication network 110, to indicate appropriate second screen content and the closed caption intended to initiate the display of the second screen content. The second screen electronic device 112 then receives closed captioning data from the audio/video content receiver as the audio/video content 114 is being viewed (e.g., during playback of the recorded content), and displays appropriate content at each event indicated by the playlist 116. In addition, the second screen electronic device 112 also receives metadata from the audio/video content receiver 104 during playback of the audio/video content 114. Such metadata is associated with a particular set of audio/video content 114, and may include, without limitation: a title, a unique program identifier, a genre, and a description.

In a second implementation of the synchronization system 100, the second screen electronic device 112 receives closed captioning data from the audio/video content receiver 104, locates specific words within the closed captioning data, and displays second screen content associated with the words displayed. To locate the second screen content for display, the second screen electronic device 112 performs a lookup at one or more remote servers to retrieve additional data associated with the located words.

For simplicity and ease of illustration, FIG. 1 and this description assume that only one playlist generator 108 is deployed in the synchronization system 100, and that only one audio/video content source 102 communicates with the playlist generator 108. It should be understood that an embodiment of the synchronization system 100 may include or support any number of playlist generators 108 and any number of audio/video content sources 102. The audio/video content source 102 is implemented as a physically distinct and remote device or system relative to the playlist generator 108. Moreover, a physically distinct audio/video content source 102 may communicate with the playlist generator 108 directly or via the data communication network 110 if so desired.

Figure 2:
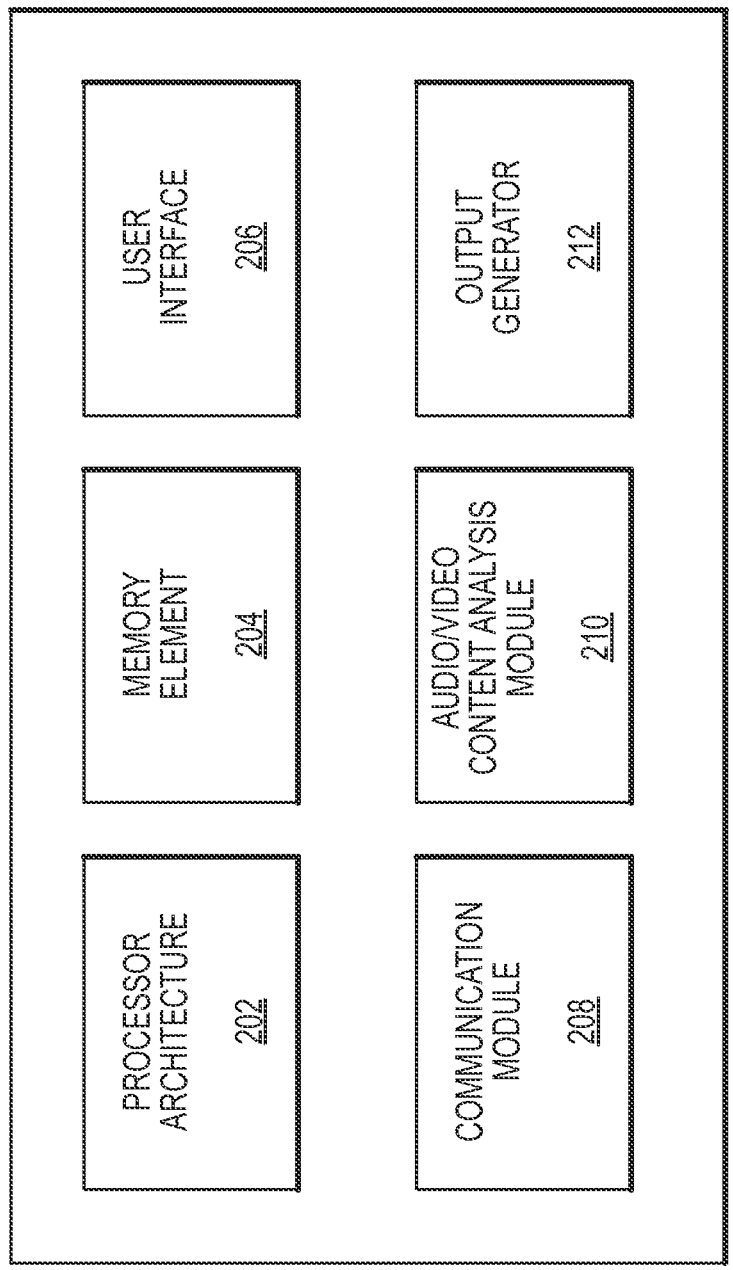
FIG. 2 is a schematic block diagram representation of a playlist generator, suitable for use in the systems shown in FIG. 1.

FIG. 2 is a schematic block diagram representation of a playlist generator 200 suitable for use in the systems shown in FIG. 1. The playlist generator 200 can be realized as a computer-based component or system. The illustrated embodiment of the playlist generator 200 generally includes, without limitation: a processor architecture 202; a memory element 204; a user interface 206; a communication module 208; an audio/video content analysis module 210; and an output generator 212. These components and elements may be coupled together as needed for purposes of interaction and communication using, for example, an appropriate interconnect arrangement or architecture. It should be appreciated that the playlist generator 200 represents a "full featured" embodiment that supports various features described herein. In practice, an implementation of the playlist generator 200 need not support all of the enhanced features described here and, therefore, one or more of the elements depicted in FIG. 2 may be omitted from a practical embodiment. Moreover, a practical implementation of the playlist generator 200 will include additional elements and features that support conventional functions and operations.

The processor architecture 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor architecture 202 may be realized as one or more microprocessors, controllers, microcontrollers, or state machines. Moreover, the processor architecture 202 may be implemented as a combination of computing devices, e.g., a combination of digital signal processors and microprocessors, a plurality of microprocessors, one or more microprocessors in conjunction with a digital signal processor core, or any other such configuration.

The memory element 204 may be realized using any number of devices, components, or modules, as appropriate to the embodiment. Moreover, the playlist generator 200 could include a memory element 204 integrated therein and/or a memory element 204 operatively coupled thereto, as appropriate to the particular embodiment. In practice, the memory element 204 could be realized as RAM memory, flash memory, EPROM memory, EEPROM memory, registers, a hard disk, a removable disk, or any other form of storage medium known in the art. In certain embodiments, the memory element 204 includes a hard disk, which may also be used to support functions of the playlist generator 200. The memory element 204 can be coupled to the processor architecture 202 such that the processor architecture 202 can read information from, and write information to, the memory element 204. In the alternative, the memory element 204 may be integral to the processor architecture 202. As an example, the processor architecture 202 and the memory element 204 may reside in a suitably designed ASIC.

The memory element 204 can be used to store and maintain information for use by the playlist generator 200. For example, the memory element 204 may be used to store references to selected audio/video content events, along with associated closed captioning data and time offsets. The memory element 204 may also be utilized to store data concerning applicable second screen content for each referenced event. Of course, the memory element 204 may also be used to store additional data as needed to support the operation of the playlist generator 200.

The user interface 206 may include or cooperate with various features to allow a user to interact with the playlist generator 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the playlist generator 200. For example, the user interface 206 could be manipulated by an operator to mark the selected events occurring throughout the audio/video content, as described above.

The communication module 208 is suitably configured to receive and perform processing on signals received by the playlist generator 200 and to transmit signals from the playlist generator 200. The communication module 208 is used to communicate data between the playlist generator 200 and one or more remote servers. As described in more detail below, data received by the communication module 208 includes audio/video content from an audio/video content source (see, for example, FIG. 1). Data provided by the communication module 208 includes a playlist detailing events and their associated closed captioning data, time offsets, and referenced second screen content for display at the time the event is viewed by a user. The communication module 208 may leverage conventional design concepts that need not be described in detail here.

The audio/video content analysis module 210 is suitably configured to perform analysis of a set of audio/video content as a whole and/or each individual frame contained within a set of audio/video content. In some embodiments, this analysis is performed to determine events occurring within a stream of audio/video content 114, as depicted in FIG. 1. In some embodiments, the analysis may be performed to determine the existence and location of events of interest occurring throughout the specific set of audio/video content. In some embodiments, the events include actions taken, words or phrases uttered, the appearance or disappearance of actors, scenery, etc. onscreen, and/or anything else that occurs in the audio/video content.

The audio/video content analysis module 210 is further configured to associate the located events with corresponding closed captioning data occurring simultaneously in the set of audio/video content. For example, when the set of audio/video content comprises a television show, and when an event comprises an action performed by an actor on the television show, the audio/video content analysis module 210 locates the occurrence of the action, determines the closed captioning data appearing onscreen at the time the action is performed, and associates the performance of the action with the appropriate closed captioning data.

In certain embodiments, the event occurs at a time that does not line up exactly with closed captioning data. In this case, the playlist generator 108 associates the event with closed captioning data appearing nearest in time to the event, and also associates a time offset to indicate the duration of time between the event and the appearance of the closed captioning data. Timing information associated with each individual frame within the stream of audio/video content 114 may be used by the playlist generator 108 to determine a time offset, and the timing information may include Presentation Time Stamp (PTS) values, Program Clock Reference (PCR) values, or the like.

The output generator 212 is suitably configured to receive and format data obtained by the audio/video content analysis module 210. In some embodiments, the data is formatted into a playlist suitable for transmission to one or more remote servers for storage and retrieval by a second screen apparatus. The playlist, therefore, conveys the audio/video content event data in an appropriate format that can be received and processed by the second screen apparatus. The output generator 212 creates the playlist to include located events, the associated closed captioning data, and a time offset (when applicable).

In addition to formatting the data obtained by the audio/video content analysis module 210 into a playlist, the output generator 212 also incorporates into the playlist a reference to appropriate second screen content for each event. The output generator 212 receives information regarding appropriate second screen content for association with each event from an external source. Generally, this information is received via the communication module 208, when the playlist generator 200 is operated using an appropriate computing apparatus, and/or the user interface 206, when the playlist generator 200 is operated manually.

FIG. 3 is a schematic representation of a playlist 300, in accordance with an embodiment. As shown, a playlist 300 generally includes a field containing a program identifier 302. Generally, the program identifier 302 acts as a unique identifier for all programming which may use the same title, and allows for the creation of a single playlist for each identified subset of audio/video content.

Each playlist 300 further includes a list of events 304 and, for each event 304, a closed captioning reference string 306, a time offset 308, and second screen content detail 302. Each of the events 304 is listed by name and/or description. The closed captioning reference string 306 includes the closed captioning data that appears onscreen when the event 304 occurs in a subset of audio/video content. Each closed captioning reference string 306 is pre-selected based on its appearance only once in a particular set of audio/video content. Once the closed captioning reference string 306 appears onscreen during viewing of the subset of audio/video content, the closed captioning reference string 306 initiates action (e.g., the presentation of additional content) on a second screen apparatus. The time offset 308 represents the time between the appearance of the closed captioning reference string 306 and the appearance of the referenced event 304 onscreen, as described with regard to FIG. 1.

The second screen content detail 310 includes a reference to, or indication of, specific content for display on a second screen apparatus simultaneously with the occurrence of each of the events. Appropriate second screen content may include any form of additional and/or associated information regarding the set of audio/video content. In certain embodiments, a reference to appropriate second screen content may include a uniform resource locator (URL) for a website, when the referenced website displays additional data for the associated event, targeted advertising associated with the event, and/or interactive content for use while viewing the event. In some embodiments, a reference to appropriate second screen content may include a representation of text and/or graphics for display while viewing the event.

Figure 4:
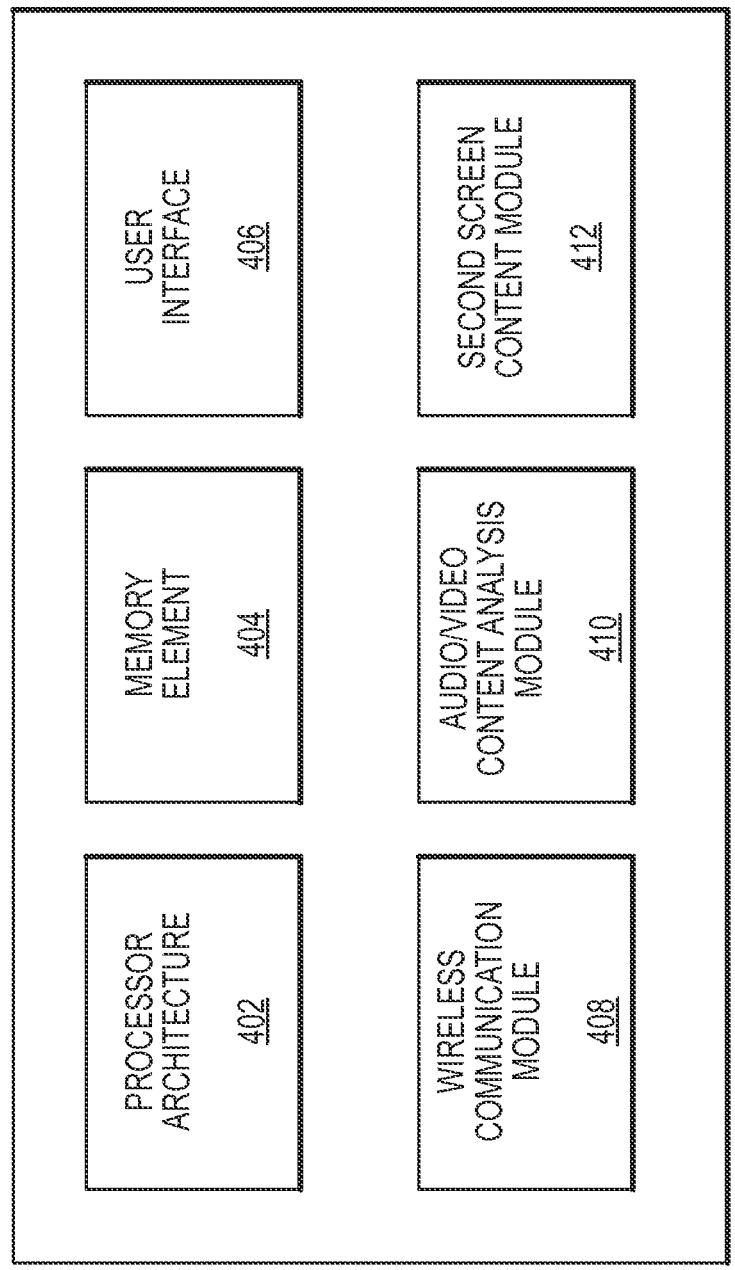
FIG. 4 is a schematic block diagram representation of a second screen apparatus suitable for use in the systems shown in FIG. 1.

FIG. 4 is a schematic block diagram representation of a second screen electronic device 400 suitable for use in the systems shown in FIG. 1. The second screen electronic device 400 can be realized as any computer-based device which may be used in conjunction with an audio/video content receiver and presentation device (shown as 104 and 106, respectively, in FIG. 1). The illustrated embodiment of a second screen electronic device 400 generally includes a processor architecture 402; a memory element 404; a user interface 406; a wireless communication module 408; an audio/video content analysis module 410; and a second screen content module 412. These elements and features of a second screen electronic device 400 may be operatively associated with one another, coupled to one another, or otherwise configured to cooperate with one another as needed to support the desired functionality—in particular, displaying second screen content indicated by received closed captioning data, as described herein. For ease of illustration and clarity, the various physical, electrical, and logical couplings and interconnections for these elements and features are not depicted in FIG. 4. Moreover, it should be appreciated that embodiments of the second screen electronic device 400 will include other elements, modules, and features that cooperate to support the desired functionality. For simplicity, FIG. 4 only depicts certain elements that relate to the second screen content display techniques described in more detail herein.

The processor architecture 402, the memory element 404, and the user interface 406, are similar in configuration and function to their counterpart items described above in the context of the playlist generator 200. Accordingly, common features and operations of these elements of the second screen electronic device 400 will not be redundantly described here. However, in some embodiments, the user interface 406 for the second screen electronic device 400 further comprises a display for viewing second screen content, which may include interactive content, targeted advertising, pop-up text, and/or additional data related to simultaneously-playing audio/video content.

The wireless communication module 408 is suitably configured to communicate data between the second screen electronic device 400 and one or more remote servers and/or one or more devices within a wireless range of the second screen electronic device 400. Generally, the wireless communication module 408 transmits and receives signals compatible with a wireless local area network (WLAN) (e.g., using an IEEE 802.11 standard). The wireless communication module 408 may utilize an an ad-hoc network, a Bluetooth network, a PAN, or a WLAN, in combination with the Internet, a cellular network, a broadband network, a wide area network, or the like.

As described in more detail below, data received by the wireless communication module 408 may include, without limitation: closed captioning data and/or metadata associated with audio/video content during playback, received from a audio/video content receiver; a playlist from a remote server; and second screen content associated with audio/video content, for display during playback of the associated audio/video content. Data provided by the wireless communication module 408 may include, without limitation: requests to remote servers to retrieve a playlist and/or indicated second screen content.

The audio/video content analysis module 410 is configured to analyze closed captioning data and timing data received by the wireless communication module 408 during playback of audio/video content on an audio/video content receiver. The audio/video content receiver is in wireless communication range of the second screen electronic device 400, and the closed captioning data and the timing data are transmitted wirelessly by the audio/video content receiver, during playback of the recorded content. In practice, the audio/video content analysis module 410 may be implemented with (or cooperate with) the processor architecture 402 to perform at least some of the functions and operations described in more detail herein. In this regard, the audio/video content analysis module 410 may be realized as suitably written processing logic, application program code, or the like.

In a first implementation, the audio/video content analysis module 410 identifies the audio/video content being played back and retrieves a playlist for the identified audio/video content (such as the playlist 300 illustrated in FIG. 3) from a remote server, via the wireless communication module 408. The audio/video content analysis module 410 performs a lookup to compare the received closed captioning data to the closed captioning reference strings associated with events cataloged in the playlist. When a match between a received caption and a closed captioning reference string in the playlist is found, the audio/video content analysis module 410 reports this result, and an indication of appropriate second screen content in the playlist, to the second screen content module 412 for display. Closed captioning data is continuously received during playback of the recorded audio/video content, and the audio/video content analysis module 410 continuously performs lookups to make comparisons and locate matching data in the playlist.

In some embodiments, a timing offset is also presented in the playlist, and the second screen electronic device 400 uses both the closed captioning data and the timing data received at the wireless communication module 408 to present second screen content at the appropriate time. For example, suppose an event includes an onscreen character placing a suitcase down on the floor. This event may be associated with a closed captioning reference string including the word "suitcase", and a timing offset of three seconds. In this example, the audio/video content analysis module 410 may receive the closed captioning data, including the word "suitcase", perform the lookup to determine a match in the playlist for the event, determine that there is a three-second timing offset associated with the event in the playlist, and communicate this information to the second screen content module 412 for further use.

In a second implementation, the audio/video content analysis module 410 does not use a playlist to determine when events of interest are occurring onscreen, but instead parses closed captioning data, received during playback of recorded content, to locate caption words indicative of events occurring onscreen. The audio/video content analysis module 410 then communicates these words to the second screen content module 412 for appropriate retrieval and presentation of second screen content associated with the words. Generally, closed caption words used include proper nouns. Within the context of this application, a "proper noun" may be defined as a capitalized noun in the transmitted closed captioning data, to include names of persons, places, or things of significant relevance to the current set of audio/video content.

In certain embodiments, the second screen electronic device 400 may utilize a "black list" of unauthorized terms, to prevent unwanted caption words from being transmitted to the second screen content module 412 to be used for the retrieval and presentation of second screen content. For example, words designated by the Federal Communications Commission (FCC) as being unfit for broadcast television during daytime hours may be present on the "black list" of words, to prevent the presentation of content associated with profane language. The "black list" of words may be user-configurable, and may include not only profanity, but any word for which a user does not wish to view additional content. In this case, if a user does not enjoy a particular television show or appreciate recent headlines associated with a particular actor, the user simply adds the name of the television show or actor to the "black list", and the second screen content module 412 will not obtain or present supplemental content based on these words.

In some embodiments, the second screen electronic device 400 may utilize a "white list" of words. Such a "white list" may be used to actively seek particular words within the closed captioning content, and to retrieve and present second screen content associated with those words. A "white list" of words may be used to ensure that particular topics, people, places, or things of interest to a user will be actively utilized for the presentation of second screen content, even when conventional methods of selecting words within received closed captioning data would have overlooked them.

In certain embodiments, the audio/video content analysis module 410 locates the caption words in the transmitted closed captioning data, and determines a context for each of the caption words in order to present second screen content that is relevant to the audio/video content. The context may be determined by analyzing received closed captioning data using, without limitation, one of the following methodologies: the type of audio/video content and the caption word; or the caption word itself, along with surrounding group of caption words.

The second screen content module 412 is configured to retrieve and display appropriate second screen content to supplement and accompany a set of audio/video content during playback on an audio/video content receiver (such as reference 104 in FIG. 1). Generally, an audio/video content receiver transmits closed captioning data and timing data to the second screen electronic device 400, where it is analyzed by the audio/video content analysis module 410 to identify events of interest in the set of audio/video content using closed captioning data (based on a pre-defined playlist or identified caption words appearing in the closed captioning data). The second screen content module 412 utilizes the information regarding these events of interest, and displays appropriate supplemental content on the second screen electronic device 400.

Supplemental content presented on a second screen may include, without limitation: graphics, text, a website address (such as a URL), advertisements, interactive user content (e.g., surveys, social media interaction, etc.) or other relevant content appropriate for display on a second screen electronic device 400. In the first implementation, where a playlist is used, the appropriate second screen content is indicated by the playlist (shown as reference 310 in FIG. 3). In the second implementation, where caption words from the closed captioning data are identified, the second screen content module 412 initiates an internet search (via the wireless communication module 408) to retrieve content relevant to a caption word. Such internet searches are performed in accordance with a determined context of the caption word, and may yield links to "official" websites, news/informational websites, websites featuring interactive content, and the like.

Figure 5:
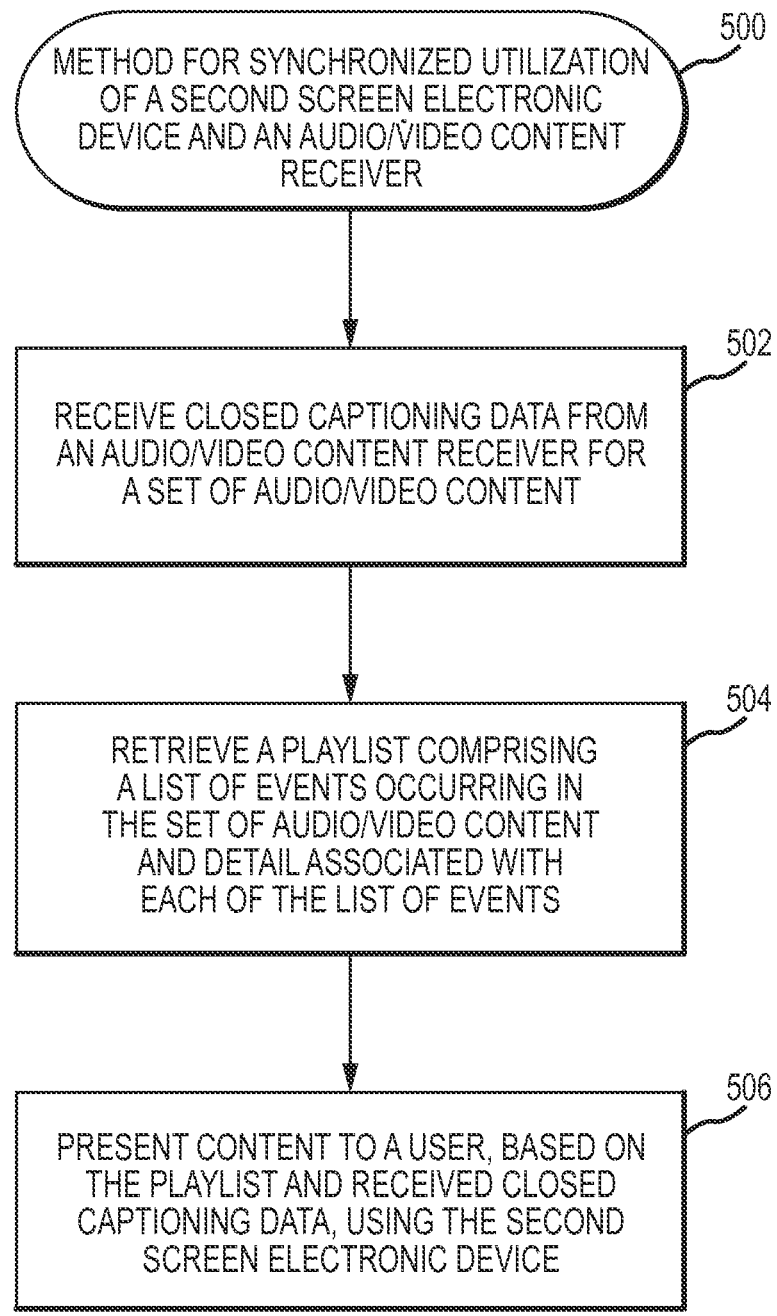
FIG. 5 is a flowchart that illustrates a first embodiment of a process for synchronized utilization of a second screen electronic device and a audio/video content source.

FIG. 5 is a flowchart that illustrates a first embodiment of a process 500 for synchronized utilization of a second screen electronic device and a audio/video content source. In this particular embodiment, a playlist is retrieved and used to supply supplemental content on a second screen electronic device. The various tasks performed in connection with process 500 may be performed by software, hardware, firmware, or any combination thereof. For illustrative purposes, the following description of process 500 may refer to elements mentioned above in connection with FIGS. 1-4. In practice, portions of process 500 may be performed by different elements of the described system, e.g., a playlist generator, an audio/video content receiver, or a second screen electronic device. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. Moreover, one or more of the tasks shown in FIG. 5 could be omitted from an embodiment of the process 500 as long as the intended overall functionality remains intact.

For clarity and ease of illustration, it is assumed that the process 500 begins by receiving closed captioning data from an audio/video content receiver for a set of audio/video content (step 502). Generally, closed captioning data is transmitted, via wireless communication network, to a second screen electronic device, where the process 500 is being executed. The closed captioning data identifies the set of audio/video content and presents subtitles, or captions, to viewers of the set of audio/video content. Closed captioning data is typically used as a transcription of the audio portion of a program as it occurs (either verbatim or in edited form), sometimes including descriptions of non-speech elements. In certain embodiments, metadata associated with the set of audio/video content is also transmitted. Metadata may include a programming identifier, a title, description, genre, or other information relevant to the particular set of audio/video content.

Next, the process 500 retrieves a playlist comprising a list of events occurring in the set of audio/video content, and detail associated with each of the list of events (step 504). A playlist is created and stored for future use, and this concept is beyond the scope of the present patent application. The playlist may be stored at a remote server or on portable media (e.g., DVD, Blu-Ray, USB storage, etc.), and may be retrieved for use. In some embodiments, the playlist is received concurrently with programming, such as that included in a cable or satellite broadcast. An exemplary embodiment of a playlist is depicted in FIG. 3. The events cataloged in the playlist are occurrences in the set of audio/video content that have some significance—they are points in the program at which supplemental content will be displayed via a second screen electronic device. The detail associated with each event includes a closed captioning reference string, or in other words, a closed caption that appears at the point in time that the event occurs in the set of audio/video content. Detail associated with each event also includes an indication of appropriate second screen content for display at the time the event occurs. In certain embodiments, the particular playlist retrieved for a particular set of audio/video content is indicated by the received metadata. For example, metadata including a particular program identifier may initiate retrieval of a playlist including the same program identifier.

In certain embodiments, a closed captioning reference string does not appear at the exact time that the event of interest occurs in the set of audio/video content during playback. In this case, a time offset is also included as part of the playlist, and the received timing data is used to determine the appropriate time for second screen content to be displayed. For example, a closed caption indicating an event may appear two seconds prior to the occurrence of the event. Here, a time offset of two seconds would be included in the playlist for the event.

The process 500 then presents content to a user, based on the playlist, using the second screen electronic device (step 506). During playback of the set of audio/video content, the process 500 continuously receives closed captioning data (step 502), and compares the received closed captioning data to the closed captioning reference strings cataloged in the retrieved playlist. When a received caption matches a closed captioning reference string for an event on the playlist, the process 500 identifies a reference to, or an indicator of, appropriate second screen content (also cataloged in the playlist), retrieves the appropriate second screen content from system memory and/or a remote server, and displays the second screen content on the second screen electronic device.

Figure 6:
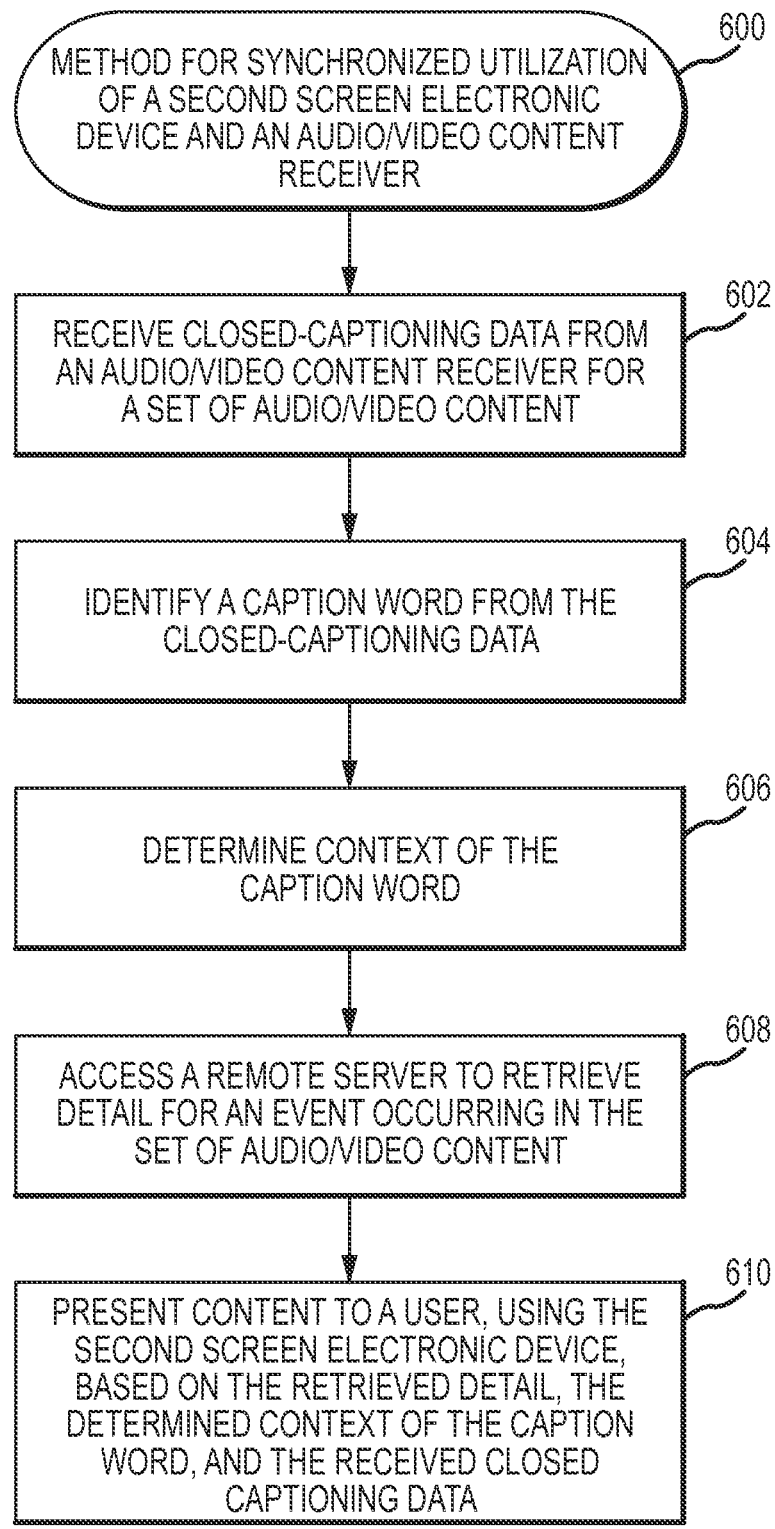
FIG. 6 is a flowchart that illustrates a second embodiment of a process for synchronized utilization of a second screen electronic device and a audio/video content source.

FIG. 6 is a flowchart that illustrates a second embodiment of a process 600 for synchronized utilization of a second screen electronic device and a audio/video content source. In this particular embodiment, caption words from the closed captioning data of a set of audio/video content are identified and used to supply supplemental content on a second screen electronic device. First, the process 600 receives closed captioning data from an audio/video content receiver for the set of audio/video content. The process 600 then identifies a word from the received closed captioning data (step 604). In certain embodiments, the word is a proper noun, or in other words, a capitalized name identifying a person, place, or thing of significance that is discussed, appears and/or occurs within the set of audio/video content. In some embodiments, the word may be selected based on a frequency of use within a program.

In certain exemplary embodiments, after identifying the caption word (step 602), based on the occurrence of the caption word in the closed captioning data of a set of audio/video content during playback, the process 600 compares the caption word to a predefined "black list" of unauthorized terms. When the caption word (e.g., proper noun) appears on the predefined list of unauthorized terms, the process 600 terminates action for the caption word and presents no content based on the caption word or associated with the particular event.

Next, the process determines the context of the identified caption word (step 606). The context may be determined by analyzing a genre of the set of audio/video content in combination with the word, or by analyzing the identified word and a group of surrounding words. For example, the set of audio/video content may include a broadcast television presentation, which may be identified by a genre or type. Genres of audio/video programming may include one of the following, without limitation: news, sports, music, comedy, drama, movie, or the like. When determining a context for the identified word using the genre of audio/video content and the word itself, the process 600 first locates a caption word in the received closed captioning data, and then retrieves the indicated genre from received metadata.

Once a caption word has been identified from the received closed captioning data, and the genre of show has been determined, the audio/video content analysis module 410 performs a lookup to determine the appropriate context. For example, if the identified caption word is the proper noun "Boston", and the type of show has been determined to be news, a determined context indicates that "Boston" is referring to the city of Boston. In another example, if the identified caption word is the proper noun "Boston" and the type of show is music, then the context would indicate that "Boston" is referring to a music band named Boston. In a final example, if the identified caption word is the proper noun "Boston" and the type of show is sports, then the determined context would indicate that "Boston" is referring to a sports team, such as the Boston Celtics.

In addition, once a caption word has been identified, the audio/video content analysis module 410 may simply present choices to the user and allow the user to determine the context for the caption word at issue. For example, if the caption word "Boston" has been identified as a relevant proper noun, the process 600 may perform an internet search and present user-selectable options for context of the use of the caption word "Boston" in the set of audio/video content currently in playback. In this case, choices may include content relevant to the city of Boston, the band named Boston, sports teams located in Boston (e.g., Celtics, Red Sox, etc.), and the like. Selections indicating "band", "basketball team", "baseball team", and/or "city" may be presented to the user, and the user may input their choice for presentation of relevant second screen content.

When determining a context for the identified caption word using the word itself and a group of surrounding caption words, the process 600 may utilize an algorithm to perform an evaluation of the group of caption words. For example, the proper noun "Ford" may indicate a brand of truck or a former President of the United States. In some embodiments of such an algorithm, the process 600 may search the closed captioning data for the words "Ford" and "F150" or the words "Ford" and "truck" in the same sentence, and if the condition is satisfied, then the context of the word "Ford" is determined to be relating to a Ford truck. In other embodiments, the process 600 may search for the same words described above, but within twenty (20) words of each other. When this condition is satisfied, the context of the word "Ford" is again determined to be relating to a Ford truck.

After determining the context of the identified word (step 606), the process 600 accesses a remote server to retrieve detail for an event, or series of events, occurring in the set of audio/video content (step 608). The "event" is the occurrence of something onscreen, whether it is something spoken, an action taken, the entrance or exit of an actor, the introduction of a change in discussion topic, and the like. Occurrence of the event is indicated by the closed captioning data, or more specifically, the identified caption word (e.g., proper noun) in its appropriate context. Generally, the retrieval of detail is in the form of an internet search for the proper noun. In certain embodiments, detail may include additional relevant information, advertisements, interactive content, or the like.

Once appropriate detail has been retrieved for the identified caption word (step 608), the process 600 presents content to a user, using a second screen electronic device, based on the retrieved detail and the determined context of the identified word (step 610). The process 600 retrieves detail associated with the identified word by performing an internet search, and the retrieved detail includes internet search results. In certain embodiments, the internet search results are narrowed, using the determined context for the identified word. Once reduced internet search results are obtained (and possibly narrowed using the context), results are presented to the user in the form of second screen content on a second screen electronic device. Results may be presented in various ways, including executing a command to open a web browser to present the following, without limitation: a first result is presented to the user in the form of a webpage; a designated number of the first results are presented as tabs in a web browser; or a result marked "official" may be presented to a user as a webpage. In some embodiments, user-selectable options may be presented to the user, from which the user may choose a result for display on the second screen electronic device.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a computer-readable or processor-readable medium or transmitted by a computer data signal embodied in a carrier wave over a transmission medium or communication path. The "processor-readable medium", "machine-readable medium", or "computer-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for synchronized utilization of an electronic device, the method comprising:
   receiving closed captioning data from an audio/video content receiver for a set of audio/video content;
   retrieving detail for a first event occurring in the set of audio/video content, wherein the first event is indicated by the received closed captioning data, by:
      accessing a remote server to retrieve a playlist comprising a list of events occurring in the set of audio/video content and detail associated with each of the list of events;
      wherein the detail associated with each of the events comprises a closed captioning reference string, a time offset, and a reference to second screen content for display after occurrence of the closed captioning reference string and passage of the time offset in the set of audio/video content;
   performing a lookup to compare the closed captioning data to a plurality of closed captioning reference strings cataloged in the playlist, to locate a match, wherein the plurality of closed captioning reference strings comprises the closed captioning reference string; and
   when a match is located,
      identifying appropriate second screen content cataloged in the playlist; and
      presenting the appropriate second screen content to a user, during occurrence of the first event during playback of the set of audio/video content, by the electronic device, based on the retrieved detail, wherein the appropriate second screen content comprises the second screen content.

2. The method of claim 1, wherein the closed captioning data comprises a proper noun, and wherein the first event is associated with occurrence of the proper noun in the closed captioning data of the set of audio/video content.

3. The method of claim 2, further comprising:
   identifying the proper noun, based on the occurrence of the proper noun;
   determining a genre for the set of audio/video content;
   determining a context for the proper noun based on the determined genre of the set of audio/video content; and
   presenting the content to the user based on the retrieved detail and the determined context.

4. The method of claim 2, further comprising:
   identifying the proper noun, based on the occurrence of the proper noun;
   evaluating a group of words surrounding the proper noun;
   determining a context for the proper noun based on the evaluated group of words; and
   presenting the content to the user based on the retrieved detail and the determined context.

5. The method of claim 1, wherein the presenting step further comprises:
   executing a command to open a web browser, via the electronic device; and
   presenting a website to the user, using the opened web browser, wherein the retrieved detail comprises a uniform resource locator (URL), and wherein the content comprises the website.

6. The method of claim 1, wherein the presenting step further comprises:
   presenting a plurality of selectable options to the user, via the electronic device, wherein the detail comprises the plurality of selectable options; and
   receiving user input to select one of the plurality of selectable options;

wherein the content comprises the selected one of the plurality of selectable options.

7. A system for processing audio/video content, the system comprising:
an audio/video content receiver, configured to provide audio/video programming to a display device and to provide closed captioning data;
a second screen electronic device, configured for use in conjunction with viewing the audio/video programming on the display device, wherein the second screen electronic device is configured to:
receive the closed captioning data provided by the audio/video content receiver;
access a remote server to retrieve detail for an event occurring in the audio/video programming, by:
accessing the remote server to retrieve a playlist comprising a list of events occurring in the set of audio/video content and detail associated with each of the list of events;
wherein the detail for the event comprises a closed captioning reference string, a time offset, and a reference to second screen content for display after occurrence of the closed captioning reference string and passage of the time offset in the set of audio/video content; and
wherein the event is indicated by the closed captioning data;
perform a lookup to compare the closed captioning data to a plurality of closed captioning reference strings cataloged in the playlist, to locate a match, wherein the plurality of closed captioning reference strings comprises the closed captioning reference string; and
when a match is located,
identify appropriate second screen content cataloged in the playlist; and
present the appropriate second screen content to a user, during occurrence of the first event during playback of the set of audio/video content, based on the retrieved detail, wherein the appropriate second screen content comprises the second screen content.

8. The system of claim 7, wherein the audio/video content receiver comprises a set-top box (STB) configured to communicate with the second screen electronic device over a wireless local area network (WLAN).

9. The system of claim 7, further comprising a single computing device,
wherein the single computing device comprises the audio/video content receiver and the second screen electronic device; and
wherein the audio/video programming and the content are presented using a shared screen of the single computing device.

10. The system of claim 7, further comprising:
a playlist generator, configured to:
manually designate the event occurring in the audio/video programming; and
associate the event with a closed captioning reference string, wherein the closed captioning reference string comprises a subset of the closed captioning data; and
a playlist creation module, configured to:
further associate the manually designated event with the content for presentation via the second screen electronic device; and
generate the playlist cataloging the event, the closed captioning reference string, and the content;
wherein the detail comprises the playlist.

11. The system of claim 7, wherein the retrieved detail comprises at least the event, an associated closed captioning reference string, and associated content detail.

12. The system of claim 11, wherein the content comprises a website, and wherein the associated content detail comprises a uniform resource locator (URL).

13. The system of claim 11, wherein the content comprises text displayed via the second screen electronic device, and wherein the associated content detail comprises a representation of the text.

* * * * *